United States Patent [19]

Dunstan

[11] 4,444,302

[45] Apr. 24, 1984

[54] CABLE DRIVE SYSTEMS FOR MOVING WALKWAYS

[75] Inventor: Phillip E. Dunstan, Seattle, Wash.

[73] Assignee: The Boeing Company, Seattle, Wash.

[21] Appl. No.: 293,591

[22] Filed: Aug. 17, 1981

[51] Int. Cl.³ .......... B65G 23/00

[52] U.S. Cl. .......... 198/334; 198/792; 104/25; 104/173 R; 104/211

[58] Field of Search .......... 198/334, 792; 104/25, 104/173 R, 211, 214, 215, 204, 205, 224

[56] References Cited

U.S. PATENT DOCUMENTS

| | | | |
|---|---|---|---|
| 3,842,961 | 10/1974 | Burson | 198/334 |
| 3,871,303 | 3/1975 | Woodling | 104/25 |
| 3,939,959 | 2/1976 | Dunstan et al. | 198/334 |

*Primary Examiner*—Joseph E. Valenza
*Assistant Examiner*—Jonathan D. Holmes
*Attorney, Agent, or Firm*—Christensen, O'Connor, Johnson & Kindness

[57] ABSTRACT

A cable drive system suitable for use with moving walkways wherein a plurality of serially connected platforms (10) travel in a circuitous path of travel that includes change-of-direction regions (18, 20) connected by constant speed zones is disclosed. The cable drive system of the invention is particularly suited for use with an accelerating and decelerating moving walkway wherein acceleration and deceleration zones are located at the beginning and end, respectively, of each constant speed zone. The cable drive system comprises a drive cable (60) positioned beneath the constant speed zones of the path of travel and releasable cable-coupling mechanisms (98) associated with and connected to the platforms (10). An actuating mechanism (94, 96 and 122, 124) actuates the cable-coupling mechanisms to grip the cable (60) at the beginning of the constant speed zones and release the cable at the end of the constant speed zones. In a preferred embodiment, the primary drive cable (60) described above is supplemented by an auxiliary cable drive mechanism that engages the platforms in the change-of-direction regions only. The latter, or low-speed, cable drive mechanism includes a cable (62) that travels around the periphery of the change-of-direction regions (18, 20), and concave grooves (142) formed in the platforms that frictionally engage the cable (62) in the change-of-direction regions.

28 Claims, 18 Drawing Figures

CABLE DRIVE SYSTEMS FOR MOVING WALKWAYS

TECHNICAL AREA

This invention is generally directed to cable drive systems and, more particularly, cable drive systems suitable for use with moving walkways comprising a plurality of platforms serially linked together and which move in a circuitous path of travel that includes constant speed zones and change-of-direction regions.

BACKGROUND OF THE INVENTION

Various types of moving walkways have been proposed in the past, including constant speed walkways as well as more sophisticated walkways capable of undergoing acceleration and deceleration. Walkways of the latter type have been disclosed, for example, in U.S. Pat. No. 3,939,959, entitled Accelerating and Decelerating Moving Walkway, and in U.S. Pat. No. 4,276,976 entitled Accelerating and Decelerating Moving Walkway With Minimal Walkway Surface Irregularities. Such walkways include serially connected, overlapping platforms that travel along an elongated, generally horizontal path of travel that includes a pair of oppositely travelling, parallel walkway surfaces positioned adjacent one another. At the opposite ends of the circuit the walkway platforms reverse direction beneath stationary cover plates that form combined entry and exit thresholds.

The platforms of walkways of the type disclosed in the above-referenced U.S. patent are connected together by flexible mechanical linkages whose length is varied to control platform overlap. More specifically, the lengths of the mechanical linkages are controlled by cam followers that are actuated by rail cams located beneath the platforms. In operation, the amount of overlap between adjacent platforms is varied in selected zones of the walkway path of travel to effect deceleration and acceleration of the walkway. For example, as the walkway platforms emerge at a relatively low speed from under an entry threshold they pass through an acceleration zone wherein the amount of overlap between adjacent platforms is decreased so as to draw apart the platforms and accelerate a passenger standing on the walkway. The platforms then pass through a constant speed zone that typically constitutes a major portion of the length of the walkway. In the constant speed zone the overlap between adjacent platforms is reduced to a minimum to transport passengers at the maximum desirable speed. As the platforms approach an exit threshold at the end of the constant speed zone the platforms pass through a deceleration zone wherein the platforms are brought closer together to decrease the amount of overlap between adjacent platforms and thereby decelerate passengers to a speed sufficiently low to step safely off the walkway.

Various types of drive systems have been proposed for driving moving walkways of the type thus far described. For example, the drive system of the walkway disclosed in U.S. Pat. No. 3,939,959 includes a pair of drive belts (or chains). Each drive belt travels in a relatively short loop beneath a portion of a constant speed zone of the walkway. Affixed to each drive belt are collars that engage cooperable lugs, which project downwardly from the walkway platforms. The drive belt, through the collars, engages and drives the immediately overlying platforms, with the remainder of the platforms in the walkway being pulled along the path of travel by the driven platforms.

The major disadvantage of the drive system described above is that power is applied directly at any given moment only to a limited number of platforms, i.e., those travelling directly over the drive mechanisms. Accordingly, the force required to drive the other platforms, particularly those travelling through the change-of-direction regions at the ends of the walkway, must be transmitted through the flexible mechanical linkages connecting serially adjacent platforms. Even though these linkages are simple and efficient devices for transmitting mechanical loads, the large number of mechanical connections in series results in a substantial energy loss, on the order of 90%, and proportionately high reaction loads in the platform-connecting devices.

Further, the direct application of power to only a relatively few platforms in the constant speed zones, together with the large energy loss incurred as the platforms travel through the change-of-direction regions, results in large imbalances in the tensile loads borne by the platform-connecting devices. For example, a large tensile load is borne by the connecting devices between the last platform engaged by a drive mechanism and the immediately succeeding platform, whereas only a minimal tensile load is borne by the connecting device between platforms just leaving the drive mechanisms. These large variations in the tensile drive load require that all of the platforms, their associated connecting mechanisms and the walkway-supporting structures be designed to bear the maximum tensile loads, thereby increasing the total weight, cost, and power requirements of the walkway.

Another problem that occasionally arises in moving walkways, wherein power is applied only to a limited number of platforms, is low-frequency mechanical oscillation. Oscillation can occur in any walkway consisting of serially linked platforms, although it is a particularly troublesome problem when the platforms are not rigidly linked together, for example, because of play in the linkages or due to flexible or nonrigid couplings between platforms. If not damped or otherwise prevented, oscillation can impair the operation of the walkway, particularly if it occurs at a resonant frequency.

Accordingly, it is the general object and purpose of the present invention to provide a new and improved drive system for a moving walkway. In particular, it is the object of the invention to provide a drive mechanism for a moving walkway having a plurality of overlapping platforms connected in series.

More specifically, it is an object of the present invention to provide a drive system for an accelerating and decelerating moving walkway comprising a plurality of overlapping platforms wherein acceleration and deceleration are effected by varying the amount of overlap between adjacent platforms.

It is another object of the present invention to attain the foregoing objects and purposes with a drive system that engages and drives a plurality of walkway platforms along constant speed zones as well as along change-of-direction regions.

It is another object to provide a drive system for a moving walkway that avoids, or at least minimizes, oscillation of the walkway.

It is another and more specific object of the present invention to provide a drive system for an accelerating and decelerating moving walkway generally of the type disclosed in U.S. Pat. No. 3,939,959 and in U.S. Pat. No. 4,276,976, which drive system engages and drives a plurality of platforms travelling through constant speed zones at a first, relatively high speed, and which also simultaneously engages and drives a plurality of platforms travelling through the change-of-direction regions at a second, relatively low speed.

SUMMARY OF THE INVENTION

In accordance with the invention, a cable drive system is provided for a moving walkway having a plurality of platforms connected in series to travel in a circuitous path of travel having constant speed zones connected by change-of-direction regions. The drive system includes a drive cable configured in a closed loop and supported by suitable sheaves to travel along a cable circuit underlying the constant speed zones of the walkway path of travel. The drive cable is driven along the cable circuit by any suitable cable drive means.

The walkway platforms support releasable cable-coupling mechanisms. An actuating mechanism actuates the cable-coupling mechanisms to grip the drive cable as the platforms enter the constant speed zones and to release the drive cable as the platforms leave the constant speed zones. In this manner, power is applied directly from the drive cable to each of the platforms in the constant speed zones. In the typical case of a walkway having constant speed zones of appreciable length, at all times a majority of the walkway platforms are connected to the drive cable, thereby conserving the energy that would otherwise be lost by the transmission of drive loads through the linkages between adjacent platforms, as occurs with other types of drive systems.

In accordance with other aspects of this invention, the actuating mechanism comprises a stationary, rail-like cam located beneath the walkway, and cooperable cam follower mechanisms connected to the walkway platforms. The cam follower mechanisms are movable in response to profile variations in the rail-like cam. The cam and the cam follower mechanisms coact to actuate the cable-coupling mechanisms attached to the platforms. The profile of the cam is selected to cause the cable-coupling mechanisms to grip the drive cable as the platforms enter the constant speed zones and release the drive cable as the platforms leave the constant speed zones.

In accordance with another aspect of this invention, the cable-coupling mechanism of each platform includes a pair of lever arms pivotably mounted for swinging movement on opposite sides of the drive cable. The associated cam follower mechanism operates in response to profile variations in the stationary cam to drive the lever arms together to grip the drive cable, and to relax pressure on the lever arms to release the cable.

The cable drive system thus far described is suitable for use in either a constant speed moving walkway, or an accelerating and decelerating moving walkway wherein the platforms overlap and acceleration and deceleration zones are located at the opposite ends of constant speed zones. In accordance with additional aspects of the invention as applied to the latter type of walkway, the actuating mechanism that controls the cable-coupling mechanisms also operates in a separate capacity to control the amount of overlap between adjacent platforms to effect acceleration and deceleration of the platforms in the acceleration and deceleration zones, respectively. The actuating mechanism actuates the cable-coupling mechanisms to couple the platforms to the drive cable as the platforms leave a zone of acceleration and enter a constant speed zone, and actuates the cable-coupling mechanisms to disengage the platforms from the drive cable as the platforms leave a constant speed zone and enter a deceleration zone. In the acceleration and deceleration zones the actuating mechanism varies the amount of overlap between adjacent platforms to effect acceleration and deceleration of the platforms. This dual function of the actuating mechanism, namely controlling the acceleration and deceleration of the platforms as well as controlling the coupling of the platforms to the drive cable, results in a particularly efficient, simple and reliable drive system. In particular, the need for separate actuating mechanisms to control the cable-coupling mechanisms and the overlapping of the platforms is avoided.

In accordance with yet other aspects of this invention, a dual-cable drive system is provided for an accelerating and decelerating moving walkway of the type described above. A first, relatively high-speed drive cable is driven along a cable circuit underlying the constant speed zones of the walkway path of travel. The platforms are connected to the high-speed cable in the constant speed zones by the cam-actuated cable-coupling mechanisms, described above. A second, relatively low-speed drive cable frictionally engages and drives the platforms as they pass through the change-of-direction regions. As a result, an even greater number of platforms are directly driven at any given moment, with only those platforms travelling through the acceleration and deceleration zones of the walkway path of travel not being directly driven.

In accordance with further aspects of this invention, the low-speed drive cable of the dual-cable system described above is supported in the change-of-direction regions by those platforms passing at any given moment through such regions. The support is provided by the frictional engagement between the cable and such platforms. More specifically, the low-speed cable is frictionally engaged by the platforms in the change-of-direction regions by being wrapped around outwardly directed cable-engaging grooves formed on the platform periphery and positioned to receive and support the low-speed drive cable. The platforms frictionally engage the low-speed drive cable as they enter a change-of-direction region and are disengaged from the cable as they leave the region, all without need for any type of cable-gripping mechanism. Additionally, supporting the low-speed drive cable on the platforms travelling through the change-of-direction regions eliminates the need for separate cable-supporting mechanisms in such regions, thereby eliminating the energy loss that would otherwise result from such cable-supporting mechanisms.

These and other aspects of the invention will become more apparent by reference to the following detailed description of preferred embodiments of the invention illustrated in the accompanying FIGURES.

DESCRIPTION OF THE PREFERRED EMBODIMENT

While the preferred embodiment of the invention, described below with reference to FIGS. 1 through 12, consists of a dual-cable drive system for an accelerating and decelerating moving walkway, it will be understood that a dual-cable drive system also may be employed to drive a constant speed walkway. Similarly, while the single cable drive system described below with reference to FIGS. 13 through 17, is shown applied to a constant speed walkway, a single cable drive system can also be applied to an accelerating and decelerating moving walkway.

Figure 1:
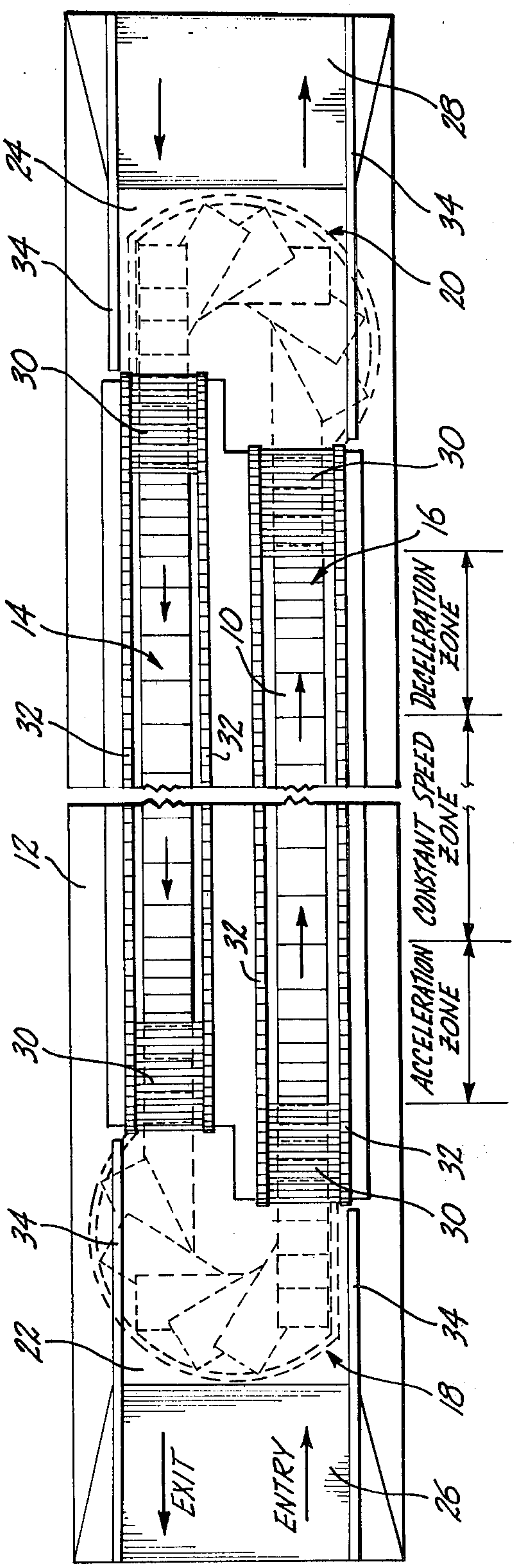
FIG. 1 is a plan view of an accelerating and decelerating moving walkway that includes serially connected platforms that overlap by varying amounts as they pass through various segments of the walkway circuit.
Figure 2:
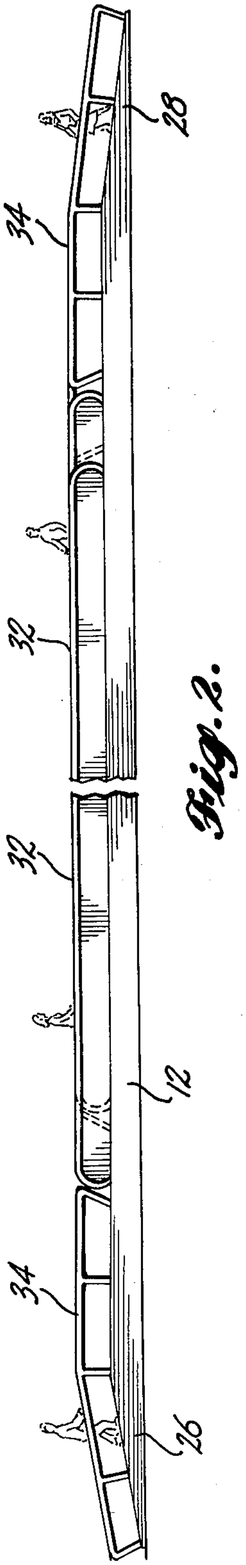
FIG. 2 is a side elevational view of the accelerating and decelerating moving walkway illustrated in FIG. 1.

FIGS. 1 and 2 illustrate an accelerating and decelerating moving walkway generally similar to those described in U.S. Pat. No. 939,959 and application Ser. No. 936,226 of Dunstan et al. Briefly, the walkway consists of a plurality of serially connected, overlapping platforms 10 that travel along an elongated, substantially horizontal path of travel inside a housing 12. The walkway path of travel includes two parallel linear regions 14 and 16 connected by semicircular change-of-direction regions 18 and 20 wherein the platforms 10 turn around. The change-of-direction regions 18 and 20 are covered by stationary threshold covers 22 and 24, which form part of the housing 12. Combination exit and entry ramps 26 and 28 lead from the threshold covers 22 and 24, respectively. Threshold combs 30 at the ends of the linear regions 14 and 16 provide safe transitions between the moving walkway and the stationary covers 22 and 24.

Each linear region 14 and 16 of the walkway consists of three zones—an acceleration zone, a constant speed zone, and a deceleration zone. The platforms 10 move through one linear region 16 from left to right (as viewed from above in FIG. 1) and through the other linear region 14 from right to left (also as viewed from above in FIG. 1). The walkway thus forms a bidirectional traffic corridor for moving passengers and/or freight.

Ordinarily, there will also be provided accelerating and decelerating moving handrails 32, best shown in FIG. 2, which are located along the sides of the linear regions 14 and 16, and which are aligned with stationary handrails 34 located along the sides of the exit/entry ramps 26 and 28 and the threshold covers 22 and 24. Since the accelerating and decelerating handrails 32 form no part of the present invention, they are not further described herein. An example of such a handrail is disclosed, however, in U.S. Pat. No. 4,240,527 entitled "Accelerating And Decelerating Handrail", issued Dec. 23, 1980.

Figure 3:
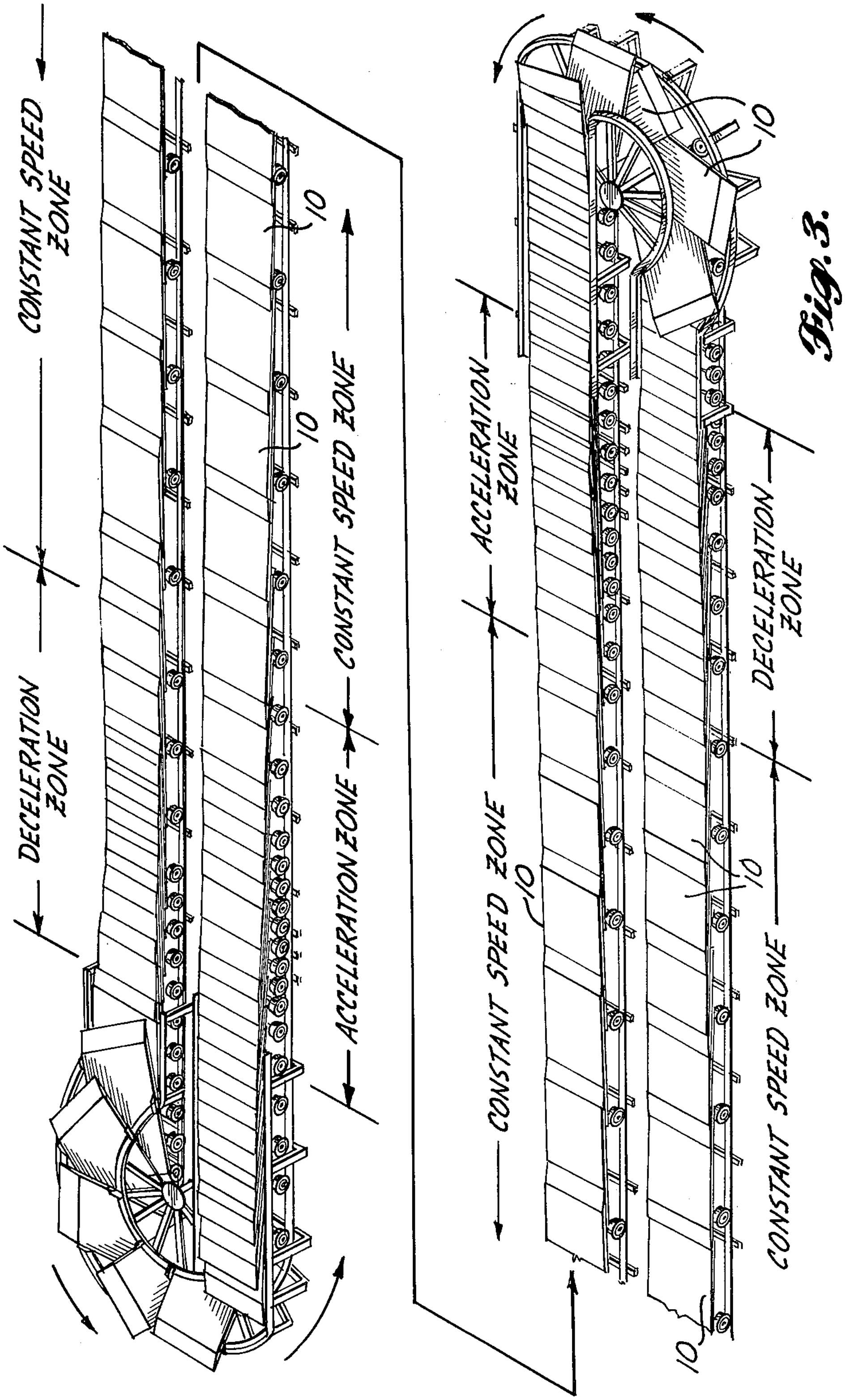
FIG. 3 is a segmented pictorial view of the accelerating and decelerating moving walkway of FIG. 1, with the walkway housing removed to show how the individual walkway platforms undergo acceleration and deceleration as their amount of overlap is varied, and how the platforms are separated from one another as they undergo changes of direction at the opposite ends of the walkway.

FIG. 3 illustrates the walkway with the housing 12 removed to show the relationships between the individual walkway platforms 10 at various points along the walkway path of travel. It will be seen that in the constant speed zones there is a minimum of overlap between adjacent platforms 10, and that the amount of overlap remains relatively constant throughout the constant speed zones. In the deceleration zones, the amount of overlap between adjacent platforms is progressively increased to decelerate the platforms as they approach the change-of-direction regions 18 and 20. As the platforms 10 pass under the threshold covers 22 and 24 (not shown in FIG. 3), they are separated in a vertical direction, swung about as they pass through the change-of-direction regions 18 and 20, and then realigned and brought back together as they emerge from under the covers 22 and 24 into the acceleration zones. In the acceleration zones, the amount of overlap between adjacent platforms 10 is progressively decreased as the platforms are drawn apart and thereby accelerated to reach their maximum operating speed in the constant speed zones.

Figure 4:
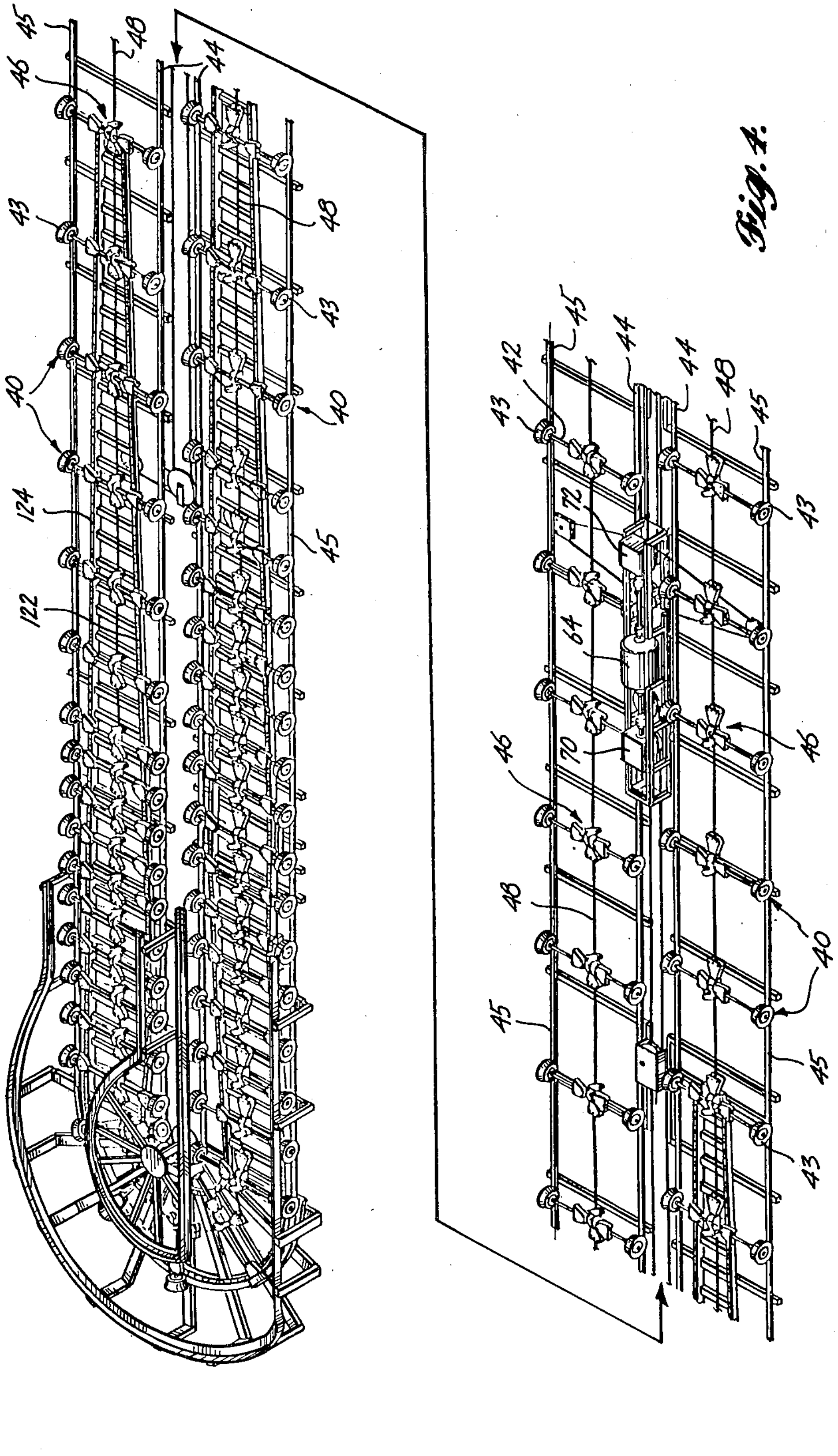
FIG. 4 is a segmented pictorial view as in FIG. 3, with the platforms removed and with the drive cables omitted to show the wheel assemblies on which the platforms are mounted.

FIG. 4 is similar to FIG. 3, but with the platforms 10 removed and portions of the cable drive system omitted for clarity. Briefly, each platform 10 is mounted on an associated wheel assembly 40. Each wheel assembly 40 includes, generally, an axle 42 and a pair of wheels 43 journalled to the opposite ends of the axle 42. The wheels 43 roll on parallel inner and outer rails 44 and 45, respectively, which define the walkway path of travel. Mounted on the axles 42 of the wheel assemblies 40 are cam follower and cable-engaging mechanisms, designated generally as 46 in FIG. 4, which are described more fully below with reference to FIGS. 7 through 12. The wheel assemblies 40 of adjacent platforms 10 are connected by extendable and retractable chains 48.

It will be seen by a comparison of FIGS. 3 and 4 that variations in the amount of overlap between adjacent platforms 10 correspond to equivalent variation in the spacing between adjacent wheel assemblies 40, with the wheel assemblies 40 being pulled closer together and drawn further apart in the deceleration and acceleration zones, respectively. Additional details regarding the structure and function of the platforms 10 and their overlapping mechanisms can be found in U.S. Pat. No. 4,276,976 of Dunstan et al, more fully referenced above. In the following discussion, only those details necessary for an understanding of the drive system of the invention are set forth.

Figure 5A:
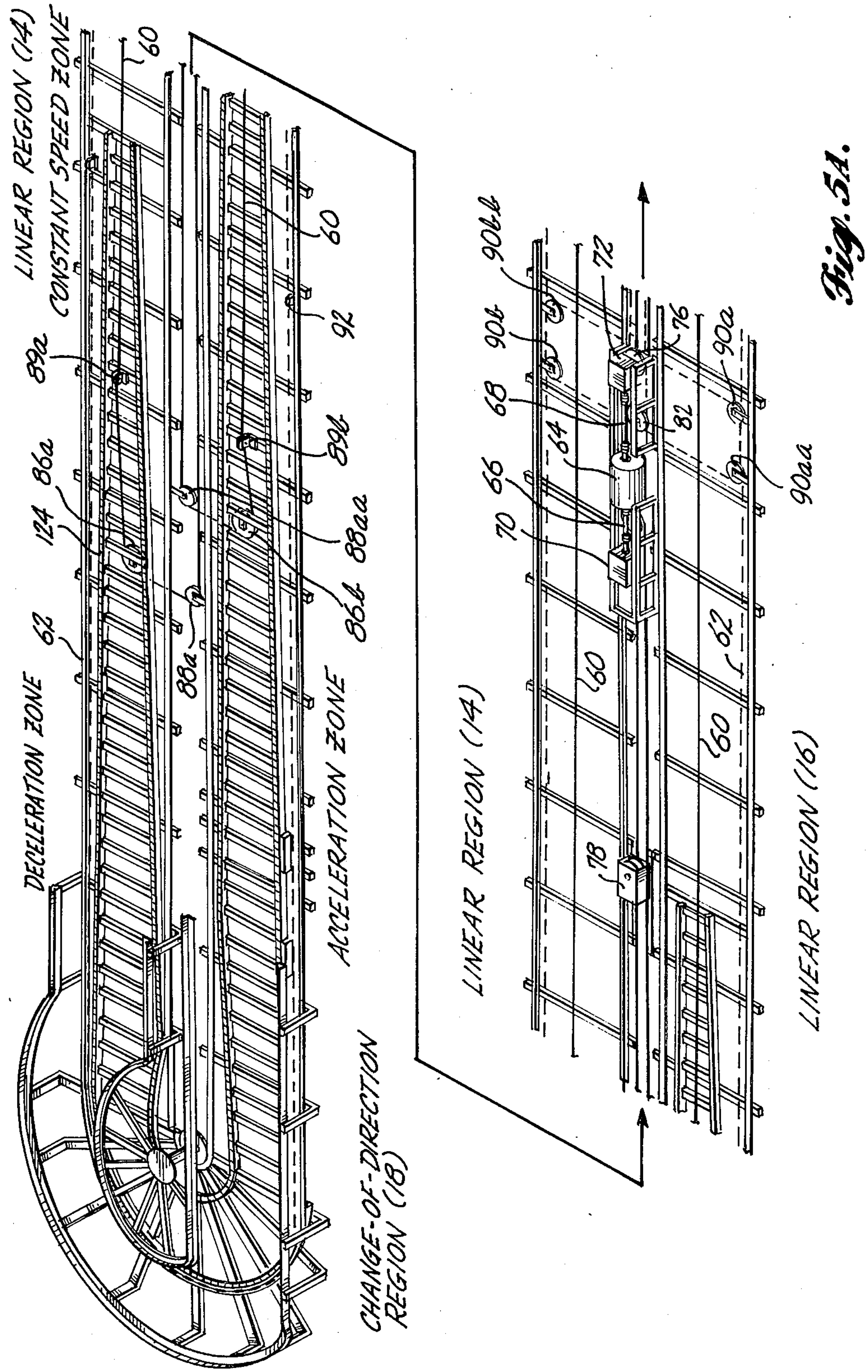
FIGS. 5A and 5B are pictorial views as in FIGS. 3 and 4, with the walkway platforms and their wheel assemblies removed to illustrate an underlying dual-cable drive system formed in accordance with the invention, and the cam rails that control platform overlap and the coupling of the walkway platforms to the drive cables.
Figure 5B:
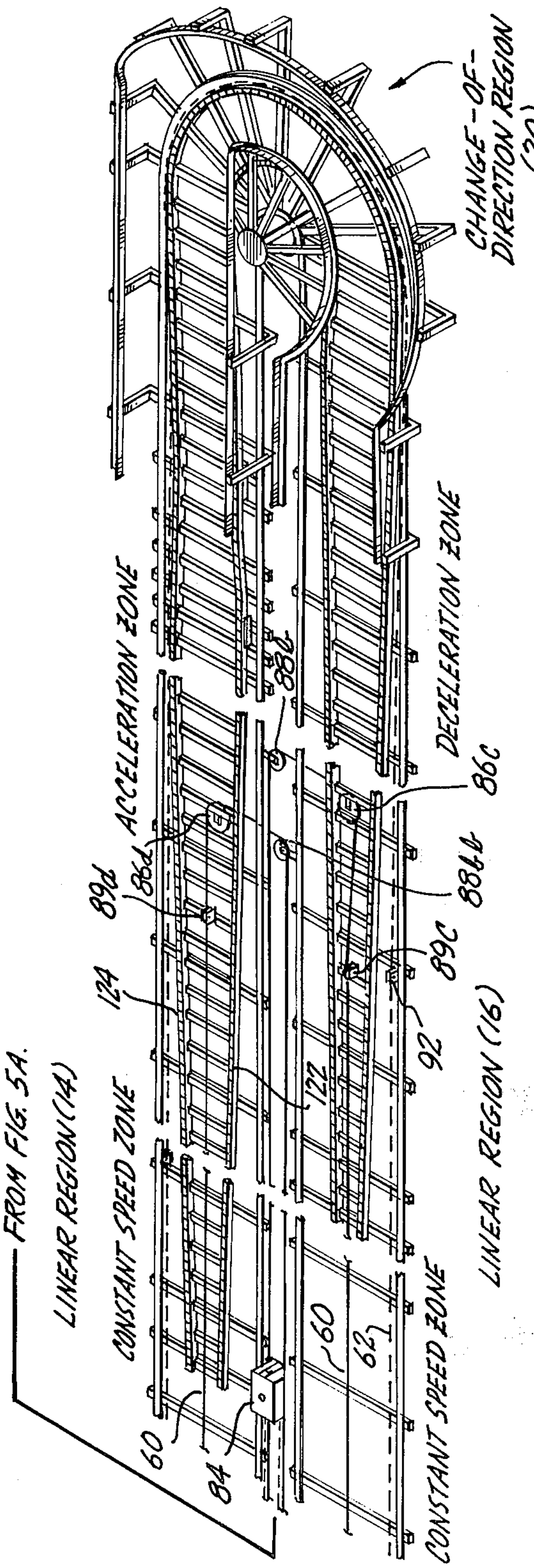
Figure 6:
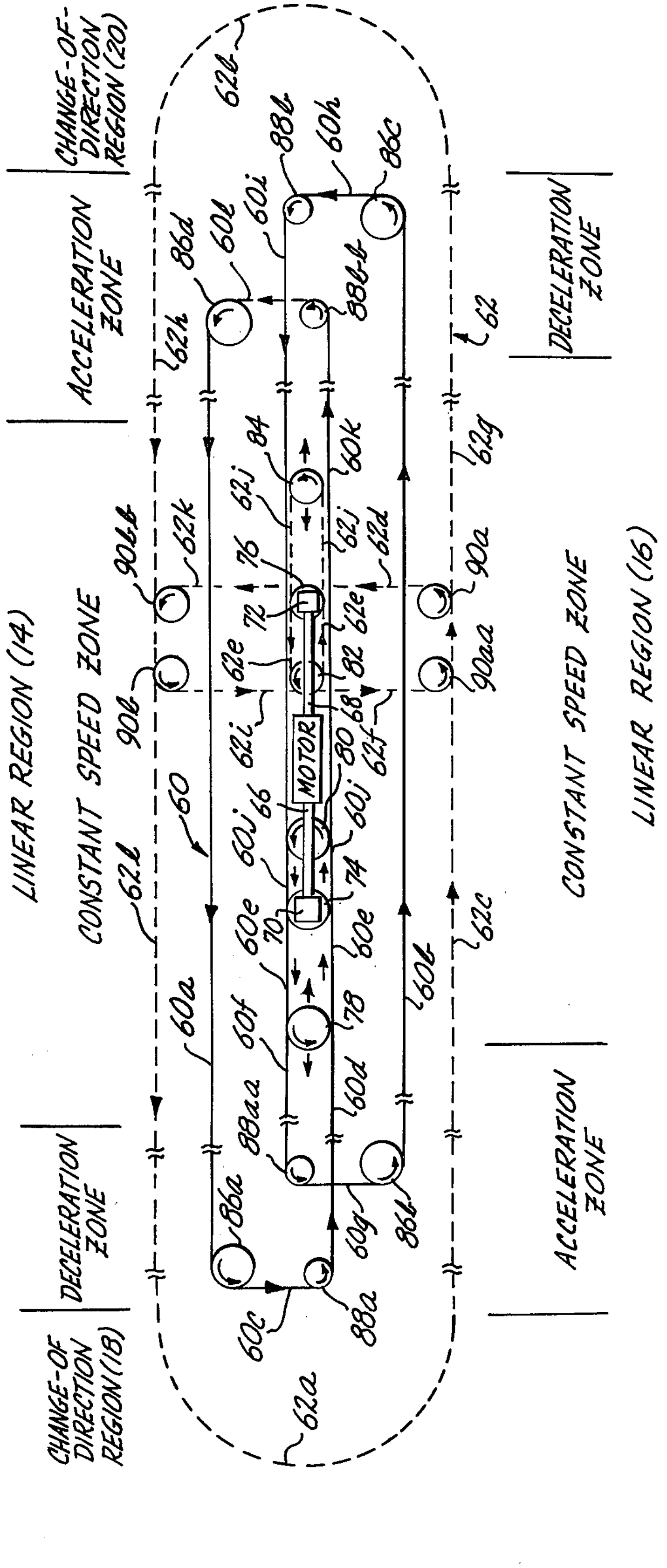
FIG. 6 is schematic plan view of the dual-cable drive system illustrated in FIG. 5.

FIGS. 5A, 5B and 6 illustrate a dual-cable drive system formed in accordance with the invention for driving the accelerating and decelerating walkway shown in FIGS. 1 through 4. The drive system includes two drive cables: a high-speed drive cable 60 and a low-speed drive cable 62. In FIGS. 5A–5B and 6, the high-speed cable 60 is shown as a solid line and the low-speed cable 62 is illustrated as a dashed line. The high-speed drive cable 60 engages and drives the platforms 10 as they pass through the constant speed zones of the linear regions 14 and 16, whereas the low-speed drive cable 62 engages and drives the platforms 10 as they pass through the change-of-direction regions 18 and 20.

The high- and low-speed drive cables 60 and 62 are commonly driven by an electric drive motor 64 centrally located inside the walkway path of travel. The motor 62 is oriented with its axis of rotation extending parallel to the linear regions 14 and 16 of the walkway path of travel. The motor 64 includes a pair of substantially coaxial drive shafts 66 and 68 extending from its opposite ends. The drive shafts 66 and 68 are connected to gearboxes 70 and 72, respectively. The gearboxes 70 and 72 include downwardly extending output shafts (not shown) that are connected to high- and low-speed drive sheaves 74 and 76, respectively. The drive sheaves 74 and 76 are, therefore, oriented with their axes of rotation extending substantially vertically. As described further below, the high- and low-speed drive sheaves 74 and 76 engage and drive the high- and low-speed cables 60 and 62, respectively. The reduction ratios of the gearboxes 70 and 72 and the diameters of the drive sheaves 74 and 76 are selected such that the drive motor 64 drives the high- and low-speed cables 60 and 62 at speeds having a predetermined ratio. In this regard, it is to be understood that the speed of the high-speed cable 60 is related to the speed of the low-speed cable 62 by a ratio that is determined by the actual dimensions and configuration of the walkway, and that this ratio may vary from one walkway to another due to variations in layout and design. However, the speed ratio for the drive cables of a given walkway is substantially constant regardless of the absolute speeds of the high- and low-speed cables 60 and 62. The use of appropriate reduction gearing and a common drive motor 64, as just described, provides the advantage of being able to maintain the necessary ratio while controlling the overall speed of the walkway by merely varying the speed of the drive motor 64.

Referring particularly to the schematic illustration of FIG. 6, outer and inner idler sheaves 78 and 80, respectively, are positioned on opposite sides of the high-speed drive sheave 74. The idler sheaves 78 and 80 and the drive sheave 74 are in alignment in a direction generally parallel to the linear regions 14 and 16 of the walkway path of travel, a direction referred to hereinafter as the longitudinal axis of the walkway. The idler sheaves 78 and 80 balance the overhung load on the drive sheave 74 to minimize bending moments on the output shaft of the high-speed gearbox 70. Likewise, inner and outer idler sheaves 82 and 84, respectively, are positioned on opposite sides of the low-speed drive sheave 76 in alignment with the longitudinal axis of the walkway. The idler sheaves 82 and 84 balance the overhung load on the drive sheave 76 to minimize bending moment on the output shaft of the low-speed gearbox 72. The outer idler sheaves 78 and 84 are adjustably movable in directions parallel to the longitudinal axis of the walkway, as indicated by the arrows in FIG. 6, and are spring-biased away from the drive sheaves 74 and 76, respectively, to maintain tension in the high- and low-speed drive cables 60 and 62 and to thereby compensate for cable stretch and temperature variations. Further, the outer idler sheaves 78 and 84 are spaced from the drive sheaves 74 and 76 by substantial distances to permit repairs and field splicing of the cables 60 and 62. Finally, preferably, a torque-limiting clutch is associated with each of the drive 76.

Referring still to FIG. 6, the directions of travel of the high- and low-speed cables 60 and 62 along their respective cable circuits are shown by arrows superimposed on the cables 60 and 62. The various cable sheaves all rotate in a counterclockwise direction, as viewed from above and as indicated by directional arrows in FIG. 6. As noted below, most of the cable sheaves illustrated in FIG. 6 include multiple cable-guiding grooves (not shown), so as to accommodate multiple portions of a cable in a vertically stacked arrangement.

The path of the high-speed cable 60 includes outer, linear circuit portions **60*a* and 60*b* that underlie the linear regions 14 and 16, respectively, of the walkway path of travel. As described further below, the platforms 10 are connected to the high-speed cable 60 along sections of the linear circuit portions 60*a* and 60*b* that underlie the constant speed zones. Beginning at the downstream end of the linear circuit portion 60*a*, (wherein the cable 60 travels toward change-of-direction region 18), the high-speed cable 60 makes a right-angle turn around a corner sheave 86*a* and enters a short end circuit portion 60*c*. From the end circuit portion 60*c* the high-speed cable 60 makes another right-angle turn around a first central end sheave 88*a*. The first central end sheave 88*a* is on the longitudinal axis of the walkway and guides the cable 60 from the end circuit portion 60*c* to a central linear circuit portion 60*d*. From the first central end sheave 88*a* the high-speed cable 60 travels along the central linear circuit portion 60*d* toward change-of-direction region 20. The high-speed cable 60 travels along the central linear circuit portion 60*d* until it reaches the high-speed drive sheave 74. Upon reaching the high-speed drive sheave 74, the high-speed cable 60 travels around the high-speed sheave 74 in a counterclockwise direction and undergoes a 180° change of direction. The high-speed cable 60 travels from the high-speed drive sheave 74 to the outer idler sheave 78 and then around the sheave 78 in a counterclockwise direction and back to the drive sheave 74**, completing one pass around a counterclockwise loop 60*e*. The cable 60 then makes two or more passes around the loop 60*e*, the cable 60 being guided in each pass by different guide grooves in the drive and idler sheaves 74 and 78. Upon emerging from the loop 60*e*, the cable 60 travels from the drive sheave 74 along a central linear circuit portion 60*f* toward the change-of-direction region 18 (to the left in FIG. 6). From the central linear circuit portion 60*f*, the high-speed drive cable 60 makes a right-angle turn around a second central end sheave 88*aa* and enters a short end circuit portion 60*g*. From the end circuit portion 60*g* the cable 60 makes another right-angle turn around a corner sheave 86*b* and enters the linear circuit portion 60*b*, where the cable 60 is gripped by the overlying platforms 10 as they travel through the constant speed zone of the linear region 16.

At the end of the outer linear circuit portion 60*b*, after the overlapping platforms 10 are disconnected from the high-speed cable 60, the high-speed cable makes a right-angle turn around a corner sheave 86*c* and enters a short end circuit portion 60*h*. From the end circuit portion 60*h* the cable 60 makes another right-angle turn around a third central end sheave 88*b* and enters a central linear circuit portion 60*i*, which appears in FIG. 6 as an extension of circuit portion 60*f*. The cable 60 travels along the linear circuit portion 60*i* toward the change-of-direction region 18 until it reaches the high-speed drive sheave 74, where it enters a counterclockwise loop 60*j*. In counterclockwise loop 60*j* the cable 60 makes two or more passes, each pass occurring in a different groove of the multiple grooves of the drive sheave 74 and the inner idler sheave 80. Upon finally emerging from the loop 60*j*, the cable 60 travels toward change-of-direction region 20 along a central linear circuit portion 60*k*, which appears in FIG. 6 as an extension of circuit portion 60*d*. From circuit portion 60*k*, the high-speed cable 60 makes a right-angle turn around a fourth central end sheave 88*bb*, and enters a short end circuit portion 601. From the end circuit portion 601, the high-speed cable 60 makes a further right-angle turn around a corner sheave 86*d* and enters the outer linear circuit portion 60*a* to complete its circuit of travel.

As illustrated best in FIGS. 5A and 5B, the outer, linear circuit portions 60*a* and 60*b* of the high-speed cable 60 drop after the cable enters a deceleration zone and rise before the cable enters a constant speed zone. Thus, the high-speed cable is elevated in the region where it is gripped by the platforms. The change in elevation is accomplished by passing the high-speed cable over sheaves 89*a*, 89*b*, 89*c*, and 89*d* located between the corner sheaves 86*a*, 86*b*, 86*c*, and 86*d* and the points where the platforms grip the cable. As will be better understood from the following description of the platform cable-gripping mechanism, such elevation change is required in order for the cable to travel to and from the drive mechanism without interfering with the platform cable-gripping mechanism.

It will be understood from the foregoing description that the high-speed cable 60 is at all times frictionally engaged by the high-speed drive sheave 74 at two separate points along the length of the cable 60. Since the drive sheave 74 is approximately centrally located, both within the walkway path of travel as well as with respect to the circuit of the high-speed cable 60, separate, balanced drive forces are applied to both of the outer linear circuit portions 60*a* and 60*b* of the high-speed cable 60. As noted above and more fully described below, it is in these regions that the high-speed cable 60 is gripped by the walkway platforms 10. As a result, drive power is symmetrically and equally applied to the portions of the high-speed cable 60 that drive the platforms 10. This arrangement reduces the length of cable between the drive source and the platform attachment points, particularly compared with a drive system wherein only one point of power attachment is present, i.e., one wherein the high-speed cable passes beneath both linear regions before being engaged by the drive source. As a result, the maximum drive load borne by the high-speed cable 60 along the various portions of its circuit is minimized, thereby reducing cable stretch and reaction loads in the various parts of the walkway structure. In addition, the symmetrical arrangement has the advantage of reducing the potential for platform oscillation.

As mentioned above, the low-speed drive cable 62 is driven by the low-speed drive sheave 76. The low-speed cable 62 travels along a cable circuit that includes change-of-direction circuit portions 62*a* and 62*b* (located in the change-of-direction regions) wherein the cable 62 is frictionally engaged by, and drives, the platforms 10. Beginning with the change-of-direction circuit portion 62*a*, located at the left-hand side of FIG. 6, the low-speed cable 62 travels along a linear circuit portion 62*c* to a first side sheave 90*a* centrally located beneath the linear region 16 of the walkway path of travel. The low-speed cable 62 turns inwardly around the first center sheave 90*a* and enters a central circuit portion 62*d*. From the circuit portion 62*d*, the low-speed cable 62 wraps around a groove in the low-speed drive sheave 76 (in a counterclockwise direction) and enters a counterclockwise loop 62*e* formed between the drive sheave 76 and the inner idler sheave 82. As noted above, both the drive sheave 76 and the inner idler sheave 82 rotate in counterclockwise directions, as viewed from above in FIG. 6. The cable 62 makes two or more passes around the loop 62*e*, guided by multiple grooves in the drive sheave and the idler sheave. The cable 62 emerges from the loop 62*e* at the idler sheave 82 and enters a circuit portion 62*f* wherein the cable 62 travels outwardly toward a second side sheave 90*aa*. The cable 62 wraps around the second side sheave 90*aa*, and enters an outer linear circuit portion 62*g* that underlies the linear region 16 of the walkway path of travel. The circuit portion 62*g* is aligned with the circuit portion 62*c* and travels in the same direction. From the circuit portion 62*g*, the low-speed cable travels through the change-of-direction portion 62*b* of its circuit, wherein it is frictionally engaged by the platforms 10, as further described below.

From the change-of-direction circuit portion 62*b*, the low-speed cable 62 passes along a linear circuit portion 62*h*, located beneath the linear region 14 of the walkway path of travel. From the linear circuit portion 62*h*, the low-speed cable 62 wraps around one groove of a third side sheave 90*b* and enters a central circuit portion 62*i*, wherein the cable 62 travels toward the inner idler sheave 82. The cable 62 wraps once around the inner idler sheave 82, and then heads toward the outer idler sheave 84. From the outer idler sheave 84, the low-speed cable makes two or more passes around a counterclockwise loop 62*j* formed between the outer idler sheave 84 and the low-speed drive sheave 76, guided by multiple grooves in these sheaves. Upon emerging from the loop 62*j* between the idler sheave 84 and the drive sheave 76, the low-speed cable 62 makes one additional loop around the inner idler sheave 82 and the drive sheave 76, and then enters an outwardly directed circuit portion 62*k*. From the circuit portion 62*k*, the low-speed cable makes a turn around a fourth side sheave 90*bb* and enters a linear circuit portion 621 underlying the linear region 14 of the walkway path of travel. From the linear region 621, the low-speed cable 62 travels to the change-of-direction portion 62*a* to complete the circuit of the low-speed cable 62. The low-speed cable is supported by suitable sheaves 92 (shows in FIGS. 5A and 5B) along the linear circuit portions 62*c*, 62*g*, 62*h* and 62*l*; and is supported in the change-of-direction regions 18 and 20 by the platforms to which it is frictionally coupled, as further described below.

As with the high-speed cable 60, the low-speed cable 62 is at all times frictionally engaged by the low-speed drive sheave 76 at two points along the length of the cable 62. As also noted above with respect to the high-speed cable 60, the low-speed drive sheave 76 is approximately centrally located within the walkway path of travel and also with respect to the circuit of the low-speed cable 62. Accordingly, power applied to the low-speed cable 62 is symmetrically balanced and equally applied to the oppositely travelling portions of the cable 62 that are engaged by the platforms 10 in the change-of-direction regions 18 and 20, as hereinafter described in more detail.

FIGS. 7 through 12 illustrate in greater detail a wheel assembly 40 of a platform 10. Although the following description refers to the particular wheel assembly 40 illustrated in the FIGURES, it will be understood that all of the wheel assemblies 40 of the walkway are substantially identical in structure and function.

Each wheel assembly 40 is located beneath the leading edge of the platform 10 it supports. The platforms 10 are supported by the wheel assemblies in the manner described in U.S. Pat. No. 4,276,976, referenced above. Slidably mounted on the axle 42 of each wheel assembly 40 are inner and outer cam followers 94 and 96. The outer cam follower 96 is located closest to the outer rail 45 defining the outer periphery of the walkway path of travel. Mounted on the axle 42 between the cam followers 94 and 96 is a cable-coupling mechanism 98.

Each wheel assembly 40 is connected to the wheel assembly of the next immediately succeeding platform by a trailing roller chain 48*a*. Each wheel assembly 40 is connected to the wheel assembly of the immediately preceding platform by a leading roller chain 48*b*. (It is to be understood that the "leading" roller chain associated with one platform is the "trailing" roller chain of the immediately preceding platform.)

Figure 9:
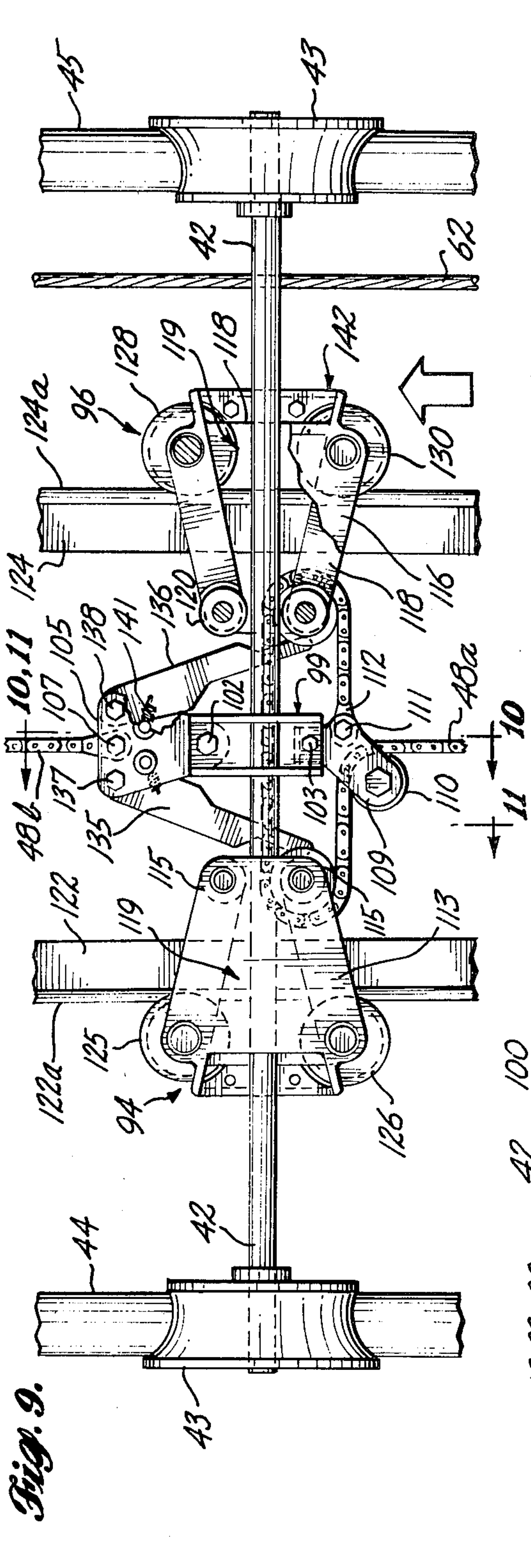
FIG. 9 is a top plan view of the wheel assembly and associated cable-gripping mechanism shown in FIG. 7.
Figure 11:
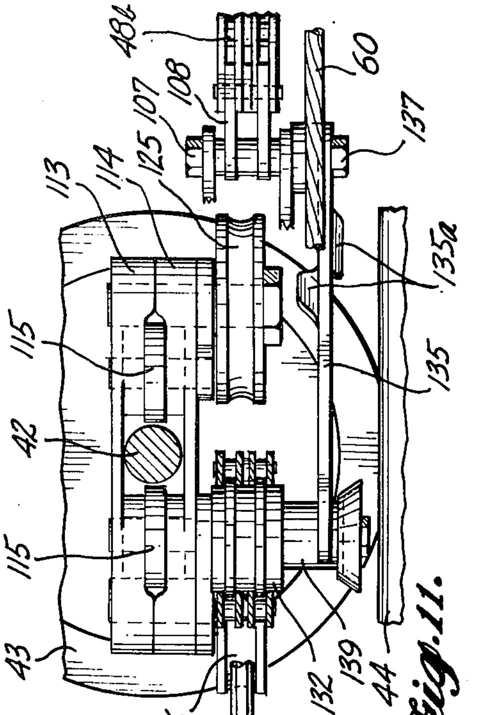
FIG. 11 is a cross section of the wheel assembly of FIG. 7, taken along section line 11—11 of FIG. 9.
Figure 10:
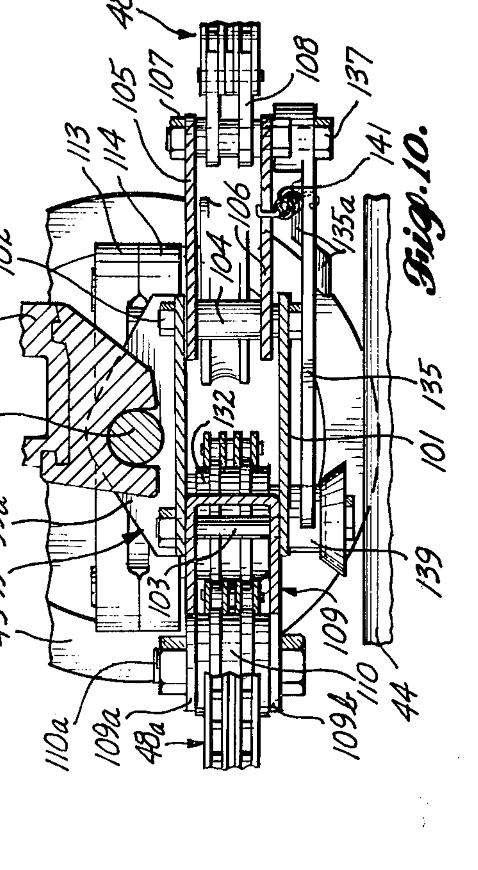
FIG. 10 is a cross section of the wheel assembly of FIG. 7, taken along section line 10—10 of FIG. 9.

The cable-coupling mechanism 98 includes a bracket 99 mounted on the axle 42 beneath its midpoint. The bracket 99 is channel-shaped in cross section and includes two upturned side portions 99*a*, as best shown in FIGS. 9 and 10. The two upturned side portions 99*a* of the bracket 99 include holes through which the axle 42 passes. A support member 100 (shown only in FIG. 10) depends downwardly from the overlying platform 10 and rests on the axle 42 between the upturned side portions 99*a* of the bracket 99. The support member 100 thereby maintains the bracket 99 centered on the axle 42, yet allows the bracket 99 to undergo limited rotational motion about the axle 42, if such is required by changes in the elevation of the rails 44 and 45 on which the wheels 43 ride.

A rectangular plate 101 is aligned with and positioned beneath the bracket 99. The rectangular plate is connected to the bracket 99 by front and rear bolts 102 and 103 located at the forward and rearward ends, respectively, of the bracket 99. While connected thereto, the rectangular plate 101 is spaced from the bracket. More specifically, the front bolt 102 supports a tubular spacer 104 and upper and lower triangular plates 105 and 106. The spacer 104 lies between the triangular plates. Thus, the upper and lower triangular plates 105 and 106 are spaced apart and are pivotably attached to the forward ends of the bracket 99 and the rectangular plate 101 by the bolt 102. The leading roller chain 48*b* is fastened to the forward ends of the triangular plates 105 and 106 by a bolt 107 that passes through the plates 105 and 106 and a terminal fitting 108 attached to the trailing end of the chain 48*b*.

Figure 8:
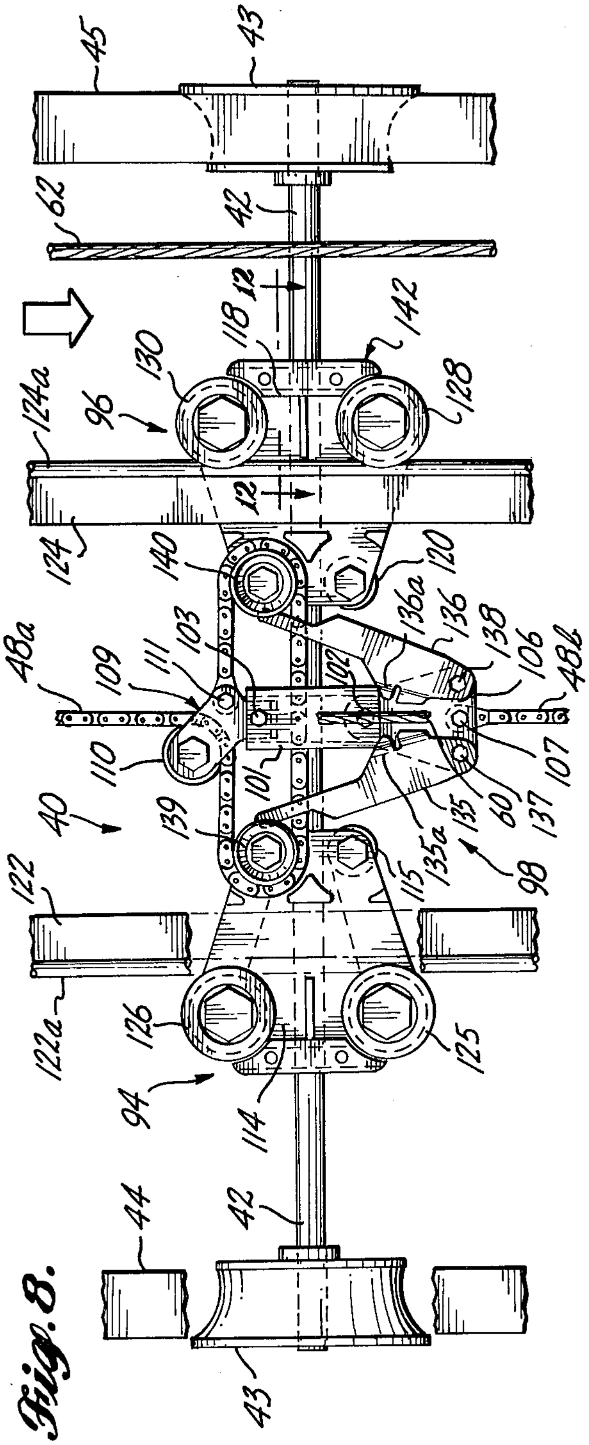
FIG. 8 is a bottom plan view of the wheel assembly and associated cable-gripping mechanism of FIG. 7.
Figure 12:
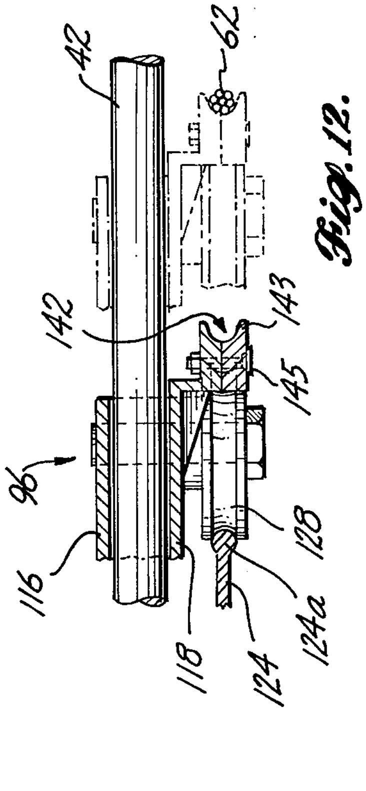
FIG. 12 is an end view of a portion of the wheel assembly of FIG. 7, taken along section line 12—12 of FIG. 8.

Pivotably attached to the rear ends of the bracket 99 and the plate 101 by the rear bolt 103 is a generally U-shaped pulley bracket 109, which includes upper and lower arms 109*a* and 109*b*. The arms 109*a* and 109*b* are angled so as to extend rearwardly and inwardly toward the inner rail 44 from the bracket 99 and the plate 101. Rotationally mounted on a bolt 11O*a*, mounted between the ends of the arms 109*a* and 109*b*, is a chain pulley 110. The pulley lies between the arms 109*a* and 109*b*. The trailing chain 48*a* wraps around the chain pulley 110 and enters a variable-size loop, which is formed between the cam followers 94 and 96 and is described in detail below. The chain 48*a* is attached to the pulley bracket 109 by means of a bolt 111, which passes through the pulley bracket arms 109*a* and 109*b* and a terminal fitting 112 located on the leading end of the chain. The point of attachment is located at the elbow of the U-shaped bracket 109, as best seen in FIGS. 8 and 9.

The inner cam follower 94 includes upper and lower cam follower baseplates 113 and 114 that are oriented generally horizontally and are clamped together. The axle 42 is slidably enclosed between the upper and lower baseplates. Further, a pair of horizontally oriented nylon rollers 115 and journalled in the upper and lower baseplates 113 and 114, on opposite sides of the axle 42. The nylon rollers are located near the inner edge of the upper and lower baseplates and allow the inner cam follower 94 to readily slide along the axle 42.

The baseplates 113 and 114 define a horizontally oriented, triangular recess 119 that diverges outwardly from the nylon rollers 115 and which is best seen in FIG. 9. The axle 42 passes through the triangular recess 119. The triangular recess allows the inner cam follower 94 to swing laterally on the axle 42 about a vertical pivot axis centered between the nylon rollers 15.

Likewise, the outer cam follower 96 includes upper and lower, horizontally oriented baseplates 116 and 118 clamped together about the axle 42. Nylon rollers 120 are journalled between the baseplates 116 and 118, near the inner edge of the baseplates and on opposite sides of the axle 42. The upper and lower baseplates of the outer cam follower 96 also define a horizontally oriented, triangular recess 119 that enables the outer cam follower 96 to undergo limited swinging motion in a horizontal plane about a vertical axis of rotation centered on the axle 42 between the nylon rollers 120.

The inner and outer cam followers 94 and 96 follow inner and outer stationary cam rails 122 and 124 that lie along the path of travel of the walkway beneath the platforms 10—see FIGS. 4, 5A and 5B. Affixed to the outer vertical surfaces of the cam rails 122 and 124 are horizontal rods 122*a* and 124*a*. The cam rails and the rods lie beneath the lower baseplates 114 and 118 of the cam followers 94 and 96. The inner cam follower 94 includes front and rear cam rollers 125 and 126. The front and rear cam rollers are journalled on vertical shafts extending downwardly from the lower baseplate 114, near the outer edge thereof. The cam rollers 125 and 126 are urged inwardly against the horizontal rod 122*a* affixed to the inner cam rail 122 in the manner described below. In a similar manner, the lower baseplate 118 of the outer cam follower 96 supports front and rear cam rollers 128 and 130. The front and rear cam followers 128 and 130 are urged against the horizontal rod 124*a* affixed to the outer cam rail 124, as also described below.

Figure 7:
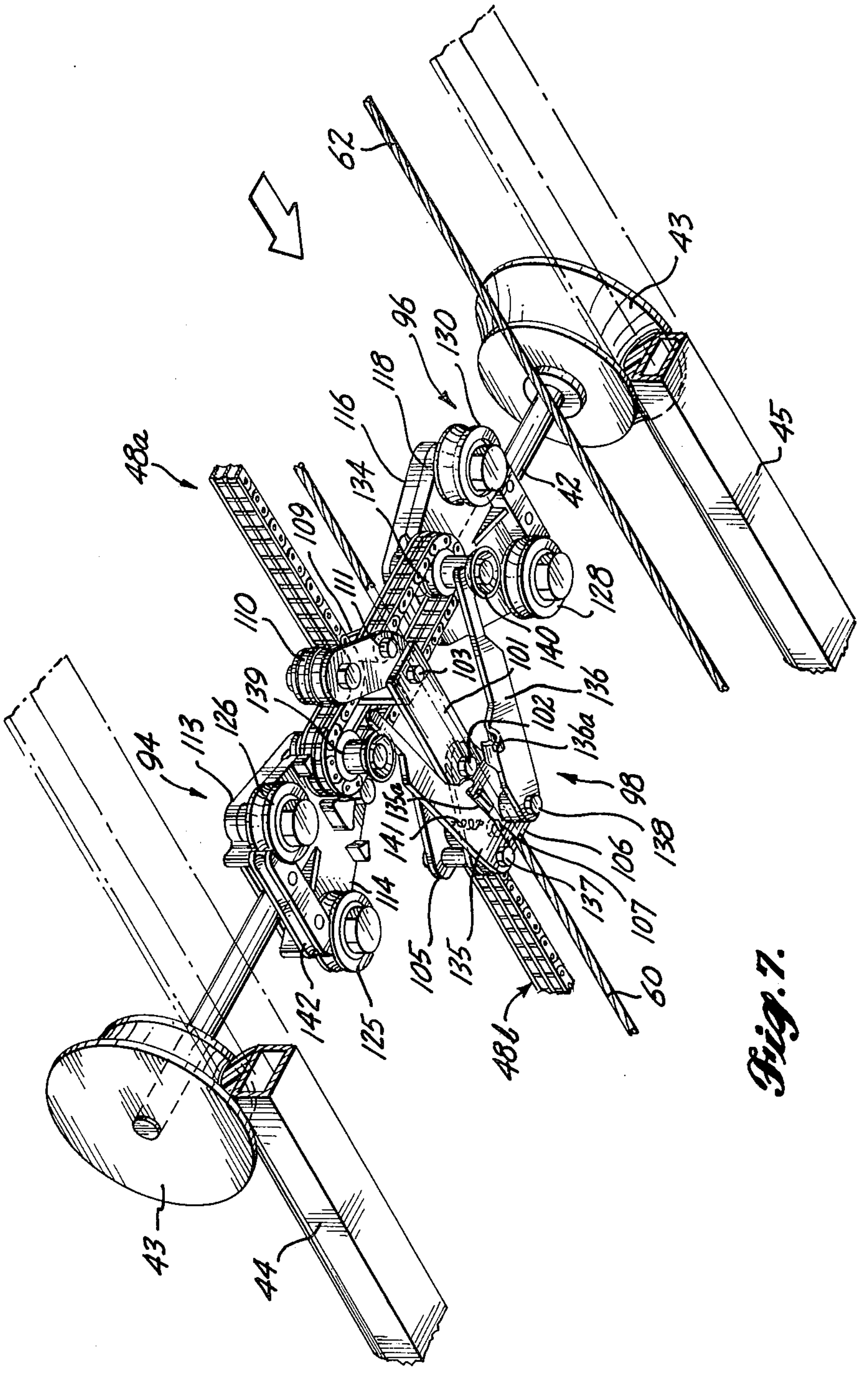
FIG. 7 is a bottom perspective view of a platform wheel assembly, showing the gripping mechanism by which the wheel assembly is coupled to the drive cables.

The inner and outer cam followers 94 and 96 further include downwardly depending chain pulleys 132 and 134 (shown best in FIG. 7). The chain pulley 132 is journalled for rotation on a vertical shaft extending downwardly from the lower baseplate 114 of the inner cam follower 94, near the inside edge thereof. The other chain pulley 134 is journalled for rotation on a vertical shaft extending downwardly from the lower baseplate 118 of the outer cam follower 96, near the inside edge thereof.

As mentioned above, the trailing roller chain 48*a* passes around the pulley 110 mounted in the pulley bracket 109 and enters a loop. The loop is formed between the chain pulleys 132 and 134, and terminates at the bolt 111 that couples the end of the chain 48*a* to the pulley bracket 109. The loop of chain formed between the chain pulleys 132 and 134 varies in circumferential length as the cam followers 94 and 96 move toward and away from one another in response to profile variations of the stationary cam rails 122 and 124.

As shown in FIGS. 4, 5A and 5B, the cam rails 122 and 124 are spaced from one another by variable distances in selected zones of the walkway, particularly the acceleration and deceleration zones. As next described, the variable cam rail spacing controls distance between the inner and outer cam followers 94 and 96, which in turn controls platform overlap and, thus, acceleration and deceleration.

As a platform 10 travels along the walkway, tension in the chains 48*a* and 48*b*, acting through the chain pulleys 132 and 134 creates a force that pulls the cam followers 94 and 96 toward one another and, thereby maintains the cam rollers 125, 126, 128, and 130 firmly pressed against the horizontal rods 122*a* and 124*a* affixed to the cam rails 122 and 124. In the acceleration zones, the spacing between the cam rails 122 and 124 progressively decreases, allowing the cam followers 94 and 96 to move closer together. As a result, a portion of the chain 48*a* from the loop formed between the chain pulleys 132 and 134 is payed out. The length of the chain 48*a* between the instant wheel assembly 40 and the succeeding wheel assembly is thereby increased to accelerate the walkway. Conversely, in the deceleration zones, the cam rails 122 and 124 diverge, thereby moving the cam followers 94 and 96 apart. As this occurs, a portion of the chain 48*a* is pulled into the loop formed between the chain pulleys 132 and 134. This effectively shortens the length of chain between the instant wheel assembly 40 and the next surrounding wheel assembly to increase the amount of overlap between the overlying platforms 10 and, thus the deceleration of the walkway.

As illustrated, the rail cams 122 and 124 converge and diverge in the acceleration and deceleration zones, and curve in the change-of-direction regions. In order to accommodate the resulting change in the cam separation distance and still maintain each of the cam rollers 125, 126, 128 and 130 urged at all times against the cam rails 122 and 124, the cam followers 94 and 96 are formed in a manner that allows them to rotate slightly in horizontal planes. Rotation of the cam followers 94 and 96 in horizontal planes is allowed by the triangular recesses 119 formed between the pairs of baseplates 113 and 114, and 116 and 118. As noted above, the vertical axes of rotation are centered between the sets of nylon rollers 115 and 120 journalled in the pairs of baseplates. This rotation allows the cam followers 94 and 96 to track or follow all profile variations of the cam rails 122 and 124, both in the acceleration and deceleration zones, and in the change-of-direction regions.

The cable-gripping mechanism 98 includes a pair of lever arms 135 and 136 and a pair of rollers 139 and 140. The lever arms 135 and 136 are pivotably attached by pivot pins 137 and 138, respectively, to the underside of the lower triangular plate 106. The pivot pins 137 and 138 extend upwardly, through the upper triangular plate 105. Thus, the lever arms are free to swing horizontally. Each of the lever arms 135 and 136 includes cable-gripping teeth 135*a* and 136*a*. The cable-gripping teeth are located along the opposing inner edges of the lever arms, near the pivot pins 137 and 138. Finally, the lever arms, and thus the cable-gripping teeth 135*a* and 136*a*, are positioned on opposite sides of the high-speed drive cable 60.

The rollers 139 and 140 (best shown in FIGS. 7 and 11) are coaxial extensions of the chain pulleys 132 and 134, respectively. The rollers and the lever arms are positioned such that the outer ends of the lever arms are engaged by the rollers when the cam followers 94 and 96 are moved inwardly in the manner herein described. Bias springs 141 running between the lever arms 135 and 136 and the lower triangular plate 106 (shown in FIG. 10) urge the lever arms 135 and 136 outwardly.

In operation, movement of the cam followers 94 and 96 toward one another (as occurs in the acceleration zones of the walkway) causes the rollers 139 and 140 to move the outer ends of the lever arms 135 and 136 together. This action moves the cable-gripping teeth 135*a* and 136*a* toward the high-speed drive cable 60. The lever arms 135 and 136 and the rollers are sized and positioned such that the high-speed cable 60 is gripped by the cable-gripping teeth 135*a* and 136*a* just as each wheel assembly 40 reaches its maximum speed at the end of an acceleration zone. Conversely, just as each platform 10 enters a deceleration zone, the cam followers 94 and 96 are spread apart (by the bias springs 141) by an amount adequate to quickly release the cable-gripping pressure. In this way slippage between the high-speed cable and the cable-gripping teeth is avoided. As a result, high-speed cable and/or cable-gripping tooth wear is minimized.

As noted above, just prior to cable-gripping engagement the elevation of the high-speed cable rises. Just after release the elevation of the high-speed cable drops. The amount of rise and fall is adequate for the cable to pass under the inner cam rails 122 and the inner wheel rails 44 when the cable travels to and from the drive mechanism. Thus, entanglement of the high-speed cable is avoided.

As already mentioned, the walkway platforms 10 engage the low-speed drive cable 62 as they pass through the change-of-direction regions 18 and 20.

More specifically, the low-speed cable 62 is engaged by an outwardly concave, cable-engaging groove 142. The cable-engaging groove is partially formed in the lower outer edge of the lower baseplate 118 of the outer cam follower 96 (shown in FIG. 12) and partially formed in a detachable plate 143 attached to the bottom of the lower baseplate by bolts 145. The cable-engaging groove is oriented and sized to receive and engage the low-speed cable 62. More specifically, in the change-of-direction regions 18 and 20, the cam rails 122 and 124 spread the cam followers 94 and 96 well apart. The outer cam follower 96 is moved laterally outwardly by an amount adequate to press the cable-engaging groove 142 against the low-speed cable 62. The pressure is adequate for the cable-engaging grooves 142 of the platforms passing through the change-of-direction regions at any given moment to frictionally engage the cable. The tension in the low-speed cable 62 is sufficient for the frictional engagement to transfer power from the cable 62 to the platforms in the change-of-direction regions. The outer cam rail 124 is configured such that each cable-engaging groove 142 engages the low-speed cable 62 just as the wheel assemblies 40 enter the change-of-direction regions, and disengages the low-speed cable 62 as the wheel assemblies 40 leave the change-of-direction regions.

Referring again to FIG. 1, it will be apparent from the foregoing discussion that the platforms 10 of the walkway are connected to the high-speed cable 60 throughout the constant speed zones of the linear regions 14 and 16 of the circuit, and frictionally engage the low-speed cable 62 throughout the semicircular change-of-direction regions 18 and 20. The only regions of the walkway path of travel where the platforms 10 are not driven by one or the other of the cables 60 and 62 are the acceleration and deceleration zones. However, the acceleration and deceleration zones ordinarily represent only a small fraction of the total length of the walkway path of travel. (In this regard, the lengths of the acceleration and deceleration zones are greatly exaggerated for purposes of illustration in FIG. 1.) Thus, the walkway platforms are substantially continuously driven along the major portion of the length of the walkway path of travel, resulting in an optimally efficient application of power from the drive motor and minimizing reaction loads in the walkway-supporting structure.

Figure 13:
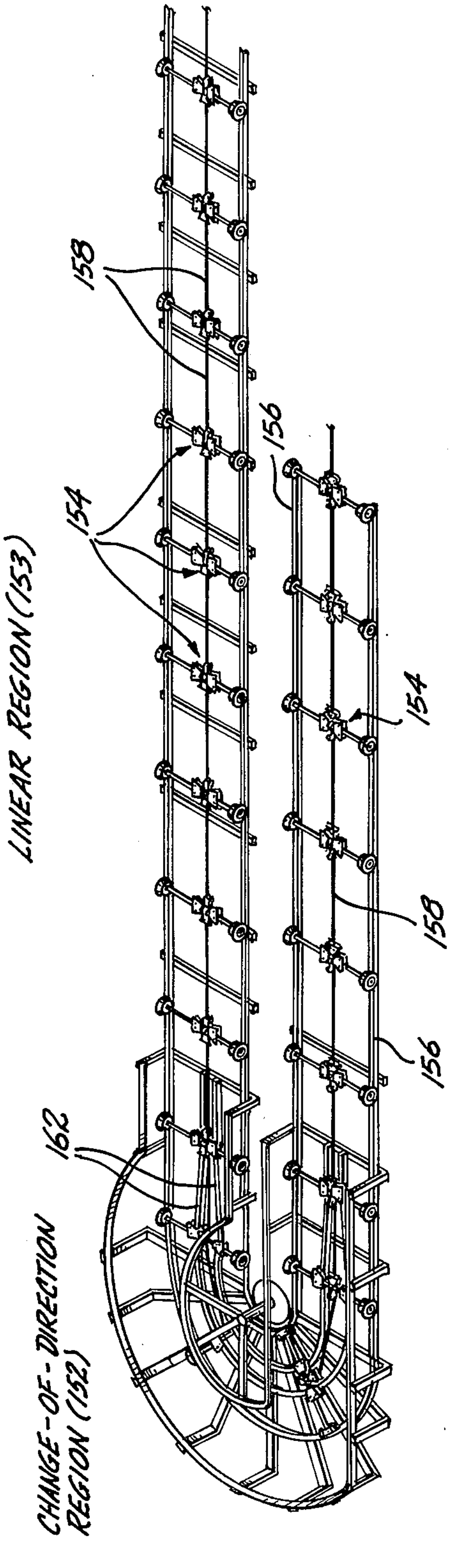
FIG. 13 is a pictorial partial view of the supporting framework and platform wheel assemblies of a constant speed moving walkway having a single cable drive system constructed in accordance with the invention.
Figure 14:
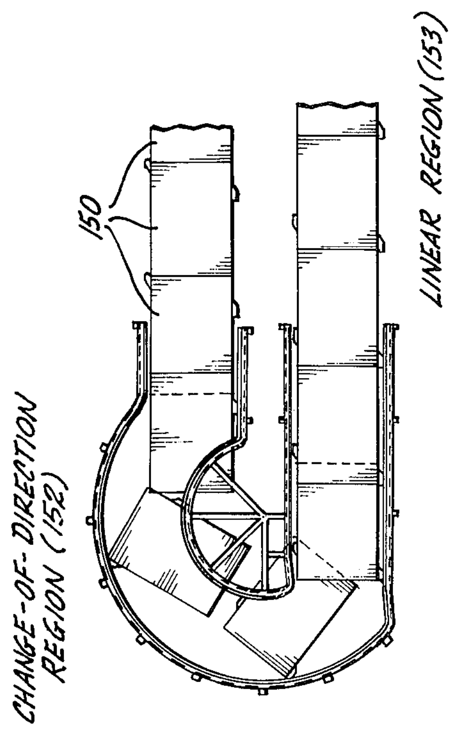
FIG. 14 is a plan view of the change-of-direction region at the left-hand end of the constant speed walkway illustrated in FIG. 13.
Figure 16:
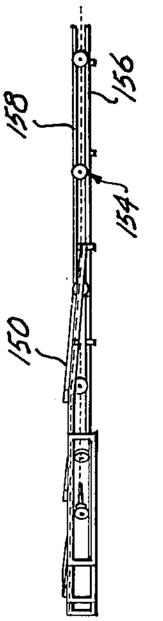
FIG. 16 is a side elevational view of the change-of-direction region of the constant speed walkway shown in FIG. 14.

FIGS. 13 through 17 illustrate an embodiment of the invention suitable for use in a constant speed moving walkway. Referring first to FIG. 14, the walkway operates in a manner generally similar to the walkway illustrated in FIGS. 1 through 5 and described above, except that it is a constant speed walkway. Thus, rather than including acceleration, constant speed, and deceleration zones in the linear regions 153 between change-of-direction regions, the entire linear regions are constant speed zones. As with the previously described walkway, walkway platforms 150 are separated at the end of each linear region 153, swung about in a change-of-direction region 152, and brought back together before entering the following linear region 153.

Referring to FIG. 13, the walkway platforms 150 are mounted on wheel assemblies 154 that roll on tracks 156 in a manner generally similar to that of the previously described walkway. Adjacent wheel assemblies 154 are connected by roller chains 158 (also shown in FIG. 15).

Figure 15:
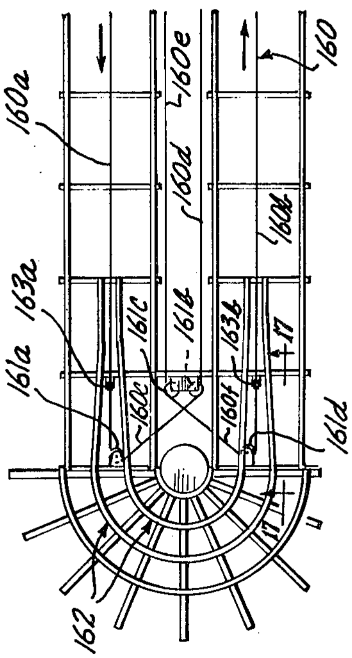
FIG. 15 is a plan view of the supporting framework and the single cable drive system at the left-hand end of the constant speed walkway of FIGS. 13 and 14.
Figure 17:
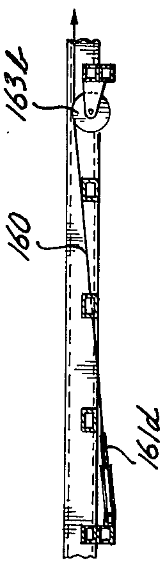
FIG. 17 is an enlarged side view in cross section of the change-of-direction region shown in FIG. 15, taken along section line 17—17 of FIG. 15, with the platforms and wheel assemblies removed to show the single cable drive system.

The drive system of the walkway illustrated in FIGS. 13 through 17 includes a single drive cable 160. The drive cable 160 is moved by an electric motor (not shown) via a mechanism similar to that used to move the high-speed cable 60 of the previously described walkway. Referring particularly to FIG. 15, the drive cable 160 travels along a circuit that includes outer linear circuit portions **160*a* and 160*b* that underlie the linear regions 153 of the walkway. Starting at the end of linear circuit portion 160*a*, the cable 160 wraps around a corner sheave 161*a* and enters an end circuit portion 160*c*. From the end circuit portion 160*c* the cable 160 travels around a central end sheave 161*b* and enters a central linear circuit portion 160*d*. The cable 160 travels along circuit portion 160*d* until it is engaged by the drive motor mechanism (not shown). The cable returns from the drive motor mechanism along a second central circuit portion 160*e*. From the central circuit portion 160*e*, the cable 160 travels around a second center end sheave 161*c* and enters a second end circuit portion 160*f*. From the end circuit portion 160*f*, the cable 160 wraps around a second corner sheave 161*d* and, then, enters the other outer linear circuit portion 160*b*. In this embodiment of the invention, the individual walkway platforms 150 are not directly driven as they pass through the change-of-direction regions 152**.

The wheel assemblies 154 engage and disengage the drive cable 160 via a cam-actuated cable-gripping mechanism similar to the mechanism illustrated in FIGS. 7 through 11 and described above. Also similarly, the cam-actuated gripping cable mechanism is controlled by pairs of spaced-apart rail cams 162. As illustrated in FIGS. 13 and 15, the pairs of rail cams 162 are located beneath the path of travel of the platforms. A pair of rail cams begins near the end of each linear region, extends through the adjacent change-of-direction region, and ends at the beginning of the next linear region. The pairs of rail cams 162 differ from the pairs of rail cams of the previously described embodiment in that while they diverge slightly where they begin and converge slightly where they end, they create substantially no platform acceleration and deceleration. Rather, their sole purpose is to control connecting the platforms to, and disconnecting the platforms from, the drive cable 160.

As with the previously described embodiment of the invention, the cable 160 is prevented from becoming entangled with the cam-actuated cable-gripping mechanism by dropping the elevation of the cable after the platforms are disconnected from and raising the elevation of the cable 160 before the platforms are connected to the cable. This is accomplished by passing the cable over vertically oriented sheaves **163*a*, 163*b*, etc. located between the leading and trailing ends of the rail cams and the corner sheaves 161*a*, 161*d*** etc.

While preferred embodiments of the present invention have been described and illustrated, it is to be understood that various alterations, modifications and substitutions may be made without departing from the spirit and scope of the invention. For example, the cable drive mechanism of the invention can be used in moving walkways wherein the walkway path of travel is in some form other than the illustrated oval form. Further, other types of mechanisms for causing cable movement can be used instead of the illustrated electric motor/gearbox/multiple sheave mechanism. Hence, the invention can be practiced otherwise than as specifically described herein.

The embodiments of the invention in which an exclusive property or privilege is claimed are defined as follows:

1. A cable drive system for moving walkway including a plurality of walkway platforms serially connected in a closed loop to travel along a circuitous walkway path of travel, said walkway path of travel having substantially constant speed zones wherein said platforms travel in substantially opposite directions between change-of-direction regions connecting said constant speed zones, said cable drive system comprising:

a first drive cable;

sheave means supporting and guiding said first drive cable along a predetermined cable circuit underlying said constant speed zones;

first drive means engaging said first drive cable for moving said cable along said cable circuit;

cable-coupling means mounted on said walkway platforms for gripping and releasing said first drive cable;

actuating means for causing said cable-coupling means to grip said first drive cable as said platforms enter said constant speed zones and release said first drive cable as said platforms leave said constant speed zones;

a second drive cable for engaging and driving said platforms in said change-of-direction regions;

second drive means engaging said second drive cable for driving said second drive cable; and, cable-engaging means mounted on said platforms for frictionally engaging said second drive cable in said change-of-direction regions, said cable-engaging means being outwardly directed from said platforms.

2. The cable drive system defined in claim 1 wherein said actuating means comprise a stationary cam positioned beneath said walkway and cam follower means mounted on said platforms and engaging said stationary cam, said cam follower means being movable in response to profile variations in said stationary cam, said movement of said cam follower means causing said cable-coupling means to grip and release said drive cable.

3. The cable drive system defined in claim 2 wherein said cable-coupling means comprises a pair of lever arms mounted on each of said platforms, said lever arms disposed on opposite sides of said drive cable, each level arm being pivotably attached at one end of its associated platform, said pivotal attachment being positioned such that said lever arms are free to swing toward one another, said swinging action causing said lever arms to grip and release said drive cable, said swinging action being controlled by said cam follower means.

4. The cable drive system defined in claim 3 wherein said cam follower means each comprise a pair of cam followers mounted on each of said platforms and movable toward and away from one another in a direction generally transverse to the direction of travel of the associated platform, one of said lever arms impinging on each of said cam followers, said impingement being such that movement of said cam followers toward one another causes said lever arms to swing together and grip said first drive cable and movement of said cam followers away from one another causes said lever arms to release said first drive cable.

5. The cable drive system defined in claim 4 wherein each of said pair of cam followers includes an inner cam follower and an outer cam follower, said outer cam followers including said outwardly directed cable-engaging means positioned such that outward movement of said outer cam follower causes said outwardly directed cable-engaging means to frictionally engage said second drive cable, the profile of said stationary cam being such that said outer cam follower is moved outwardly in said change-of-direction regions by an amount adequate to cause said outwardly directed cable-engaging means to frictionally engage said second drive cable.

6. A cable drive system for an accelerating and decelerating moving walkway including a plurality of overlapping walkway platforms serially connected in a closed loop to travel along a circuitous walkway path of travel, said walkway path of travel having substantially constant speed zones wherein said platforms travel in substantially opposite directions between change-of-direction regions connecting said constant speed zones, said walkway further including overlap control means for controlling the amount of overlap between serially adjacent platforms to effect the acceleration and deceleration of said platforms in acceleration and deceleration zones lying between said constant speed zones and said change-of-direction regions, said cable drive system comprising;

a drive cable;

sheave means supporting and guiding said drive cable along a predetermined cable circuit underlying said constant speed zones;

drive means engaging said drive cable for moving said cable along said cable circuit;

cable-coupling means mounted on said walkway platforms for gripping and releasing said drive cable; and, actuating means forming part of said overlap control means for causing said cable-coupling means to grip said drive cable as said platforms enter said constant speed zones and release said drive cable as said platforms leave said constant speed zones.

7. The cable drive system defined in claim 6: wherein said overlap control means includes a stationary cam positioned beneath said walkway, cam follower means mounted on each of said platforms and extendable and retractable coupling means running between adjacent pairs of platforms, said cam follower means being movable in response to profile variations in said stationary cam, said movement varying the amount of overlap between adjacent platforms by extending and retracting said extendable and retractable coupling means; and, wherein movement of said cam follower means relative to said platforms actuates said cable-coupling means to grip and release said drive cable.

8. The cable drive system defined in claim 7 wherein said cable-coupling means comprises a pair of lever arms mounted on each of said platforms, said lever arms disposed on opposite sides of said drive cable, each lever arm being pivotably attached at one end to its associated platform, said pivotal attachment being positioned such that said lever arms swing toward one another, said swing action causing said lever arms to grip and release said drive cable, said swinging action being controlled by said cam follower means.

9. The cable drive system defined in claim 8 wherein said cam follower means comprises a pair of cam followers mounted on each of said platforms and movable toward and away from one another in a direction generally transverse to the direction of travel of the associated platform, one of said lever arms impinging on each of said cam followers, said impingement being such that movement of said cam followers toward one another causes said lever arms to swing together and grip said cable and movement of said cam followers away from one another causes said lever arms to release said drive cable.

10. The cable drive system defined in claim 6 wherein: (a) said drive cable is a first drive cable and said drive means is a first drive means; (b) said cable drive system further comprises a second drive cable for engaging and driving said platforms in said change-of-direction regions, and second drive means engaging said second drive cable for driving said second drive cable; and, (c) said platforms including outwardly directed cable-engaging means for frictionally engaging said second drive cable in said change-of-direction regions.

11. The cable drive system defined in claim 10: wherein said overlap control means includes a stationary cam positioned beneath said walkway, cam follower means mounted on each of said platforms and extendable and retractable coupling means running between adjacent pairs of platforms, said cam follower means being movable in response to profile variations in said stationary cam, said movement varying the amount of overlap between adjacent platforms by extending and retracting said extendable and retractable coupling means; and, wherein movement of said cam follower means relative to said platforms actuates said cable-coupling means to grip and release said drive cable.

12. The cable drive system defined in claim 11 wherein said cable-coupling means comprises a pair of lever arms mounted on each of said platforms, said lever arms disposed on opposite sides of said first drive cable, each lever arm being pivotably attached at one end to its associated platform, said pivotal attachment being positioned such that said lever arms swing toward one another, said swinging action causing said lever arms to grip and release said drive cable, said swinging action being controlled by said cam follower means.

13. The cable drive system defined in claim 12 wherein said cam follower means comprises a pair of cam followers mounted on each of said platforms and movable toward and away from one another in a direction generally transverse to the direction of travel of the associated platform, one of said lever arms impinging on each of said cam followers, said impingement being such that movement of said cam followers toward one another causes said lever arms to swing together and grip said cable and movement of said cam followers away from one another causes said lever arms to release said first drive cable.

14. The cable drive system defined in claim 13 wherein each of said pair of cam followers includes an inner cam follower and an outer cam follower, said outer cam followers including said outwardly directed cable-engaging means positioned such that outward movement of said outer cam follower causes said outwardly directed cable-engaging means to frictionally engage said second drive cable, the profile of said stationary cam being such that said outer cam follower is moved outwardly in said change-of-direction regions by an amount adequate to cause said outwardly directed cable-engaging means to frictionally engage said second drive cable.

15. The cable drive system defined in claim 6 wherein said drive cable includes two drive loops, a portion of each of said drive loops underlying a constant speed zone of said moving walkway, said drive means engaging both of said drive loops.

16. A cable drive system for moving walkway including a plurality of walkway platforms serially connected in a closed loop to travel along a circuitous walkway path of travel, said walkway path of travel having substantially constant speed zones wherein said platforms travel in substantially opposite directions between change-of-direction regions connecting said constant speed zones, said cable drive system comprising:

a drive cable, said drive cable including two drive loops, a portion of each of said drive loops underlying a constant speed zone of said moving walkway;

sheave means supporting and guiding said drive cable along a predetermined cable circuit underlying said constant speed zones;

drive means engaging said drive cable for moving said cable along said cable circuit, said drive means engaging both of said drive loops;

cable-coupling means mounted on said walkway platforms for gripping and releasing said drive cable; and, actuating means for causing said cable-coupling means to grip said drive cable as said platforms enter said constant speed zones and release said drive cable as said platforms leave said contant speed zones.

17. The cable drive system defined in claim 15 or 16 wherein said two drive loops are formed from a single cable and wherein said drive means engages both of said drive loops where the two loops join.

18. The cable drive system defined in claim 17 wherein said drive means comprises an electric motor and a drive sheave coupled to said electric motor, said drive cable wrapped around said drive sheave such that said drive sheave frictionally engages said drive cable.

19. The cable drive system defined in claim 1 or 10 wherein said first drive cable includes two drive loops, a portion of each of said drive loops underlying a constant speed zone of said moving walkway, said first drive means engaging both of said drive loops.

20. The cable drive system defined in claim 19 wherein said two drive loops are formed from a single cable and wherein said first drive means engages both of said drive loops where the two loops join.

21. The cable drive system defined in claim 20 wherein said second drive cable also includes two drive loops, a portion of each of said drive loops travelling around a change-of-direction region of said moving walkway, said second drive means engaging both of said drive loops of said second drive cable.

22. The cable drive system defined in claim 21 wherein said two drive loops of said second drive cable are formed from a single cable and wherein said second drive means engages both of said drive loops where the two loops join.

23. The cable drive system defined in claim 22 wherein said first and second drive means comprise an electric motor and first and second drive sheaves coupled to said electric motor, said first drive cable wrapped around said first drive sheave such that said first drive sheave frictionally engages said first drive cable, said second drive cable wrapped around said second drive sheave such that said second drive sheave frictionally engages said second drive cable.

24. The cable drive system defined in claim 19 wherein said second drive cable also includes two drive loops, a portion of each of said drive loops travelling around a change-of-direction region of said moving walkway, said second drive means engaging both of said drive loops of said second drive cable.

25. The cable drive system defined in claim 24 wherein said first and second drive means comprise an electric motor and first and second drive sheaves coupled to said electric motor, said first drive cable wrapped around said first drive sheave such that said first drive sheave frictionally engages said first drive cable, said second drive cable wrapped around said second drive sheave such that said second drive sheave frictionally engages said second drive cable.

26. The cable drive system defined in claim 1 or 10 wherein said second drive cable includes two drive loops, a portion of each of said drive loops travelling around a change-of-direction region of said moving walkway, said second drive means engaging both of said drive loops.

27. The cable drive system defined in claim 26 wherein said two drive loops are formed from a single cable and wherein said second drive means engages both of said drive loops where the two loops join.

28. The cable drive system defined in claim 27 wherein said second drive means comprises an electric motor and a drive sheave coupled to said electric motor, said second drive cable wrapped around said drive sheave such that said drive sheave frictionally engages said second drive cable.

* * * * *